United States Patent
Caswell et al.

[19]

[11] Patent Number: 5,950,738
[45] Date of Patent: Sep. 14, 1999

[54] INVERTED CONE CUTTER ATTACHMENT FOR ICE AUGER

[75] Inventors: Ty J. Caswell, Big Lake; Jeffrey M. Eliason, Shoreview, both of Minn.

[73] Assignee: Outdoor Creations, Inc., Coon Rapids, Minn.

[21] Appl. No.: 08/984,925

[22] Filed: Dec. 4, 1997

[51] Int. Cl.$^6$ ...................................................... F25C 5/04
[52] U.S. Cl. ................................ 175/18; 299/24; 408/713
[58] Field of Search ................................ 175/18, 53, 55; 408/713; 299/24, 25, 27, 28

[56] References Cited

U.S. PATENT DOCUMENTS

| | | |
|---|---|---|
| 774,051 | 11/1904 | Driskill . |
| 1,406,348 | 2/1922 | Corrigan . |
| 1,561,523 | 11/1925 | Riedle . |
| 1,710,998 | 4/1929 | Rudkin . |
| 1,970,063 | 8/1934 | Steinman . |
| 2,301,478 | 11/1942 | Tibbals, Jr. et al. . |
| 2,401,250 | 5/1946 | Kandle . |
| 3,299,970 | 1/1967 | Anderson . |
| 3,336,989 | 8/1967 | Henderson . |
| 3,397,750 | 8/1968 | Wicklund . |
| 3,731,751 | 5/1973 | Rusco ........................................ 173/26 |
| 3,749,184 | 7/1973 | Andeen ..................................... 175/18 |
| 4,819,744 | 4/1989 | Caswell ..................................... 175/18 |
| 5,190,113 | 3/1993 | Hawrylak ................................... 175/18 |

FOREIGN PATENT DOCUMENTS

| | | |
|---|---|---|
| 185277 | 9/1966 | U.S.S.R. . |
| 726321 | 4/1980 | U.S.S.R. . |

OTHER PUBLICATIONS

Flyer, "New Jiffy Line Saver," Feldman Engineering & Mfg. Co., Sheboygan Falls, WI, 1 page (published prior to Dec. 4, 1997).

Brochure: "StrikeMaster Ice Augers 1996–1997 Catalog," StrikeMaster Corp., Big Lake, MN 12 pages (published prior to Dec. 4, 1997).

Brochure: "Jiffy Ice Drills," Feldman Engineering & Mfg. Co., Sheboygan Falls, WI, 4 pages, Form WS0004–12V (Dec. 1995).

Flyer: "Jiffy Ice Drills," Feldman Engineering & Mfg. Co., Sheboygan Falls, WI, 2 pages, Form WS0006–11V (Nov. 1995).

Flyer: "Jiffy Ice Drills," Feldman Engineering & Mfg. Co., Sheboygan Falls, WI, 2 pages, Form WS0002–12V (Dec. 1995).

Flyer: "NEW! Eskimo Hi–Speed 3HP Powered Ice Auger, Model 9000," Ardisam, Inc., Cumberland, WI, 2 pages (published prior to Dec. 4, 1997).

Flyer: "Eskimo Powered Ice Auger—Model 8900," Ardisam, Inc., Cumberland, WI, 2 pages (published prior to Dec. 4, 1997).

Flyer: "Eskimo Plus Power Ice Auger—Model 9400," Ardisam, Inc., Cumberland, WI, 2 pages (published prior to Dec. 4, 1997).

*Primary Examiner*—Roger Schoeppel
*Attorney, Agent, or Firm*—Kinney & Lange, P.A.

[57] ABSTRACT

Using a standard ice auger having a central shaft, a spiral flighting affixed thereon, and an ice cutting blade at the lower end of the flighting, a cylindrical ice hole is bored through an ice sheet. The inventive apparatus, mounted adjacent a lower portion of the standard ice auger, is then used to form an inverted funnel-shaped area at the lower end of the cylindrical ice hole. The inventive apparatus includes a bracket mounted to the ice auger and an ice hole flaring blade pivotally mounted to the bracket. A spring biases the ice hole flaring blade toward a transport position wherein the blade has its free end extending toward an upper end of the ice auger. The ice hole flaring blade is pivotable to an operable position wherein the blade is aligned generally below the ice cutting blade of the auger and has its free end extending downwardly and outwardly from the central shaft of the ice auger. In this operable position, the ice hole flaring blade is aligned to cut an angled cone-shaped face at the bottom edge of the previously formed cylindrical ice hole.

30 Claims, 12 Drawing Sheets

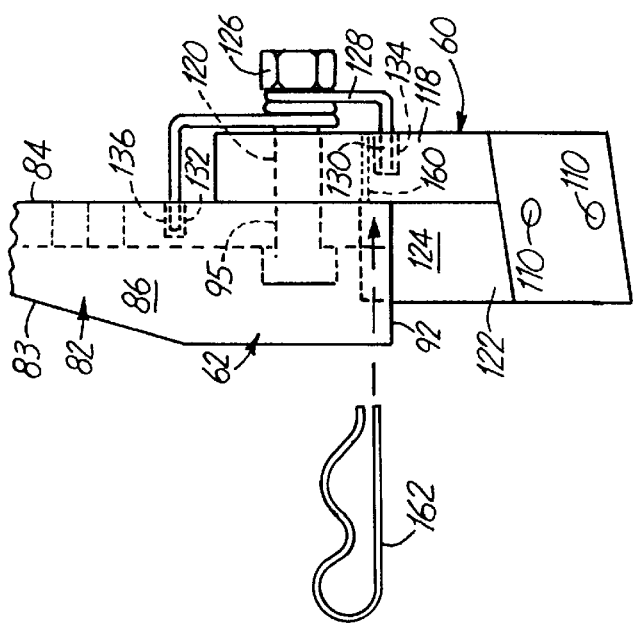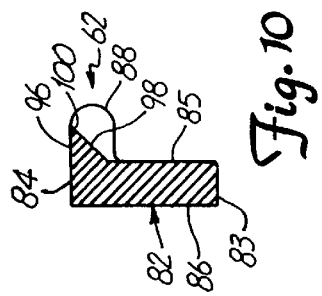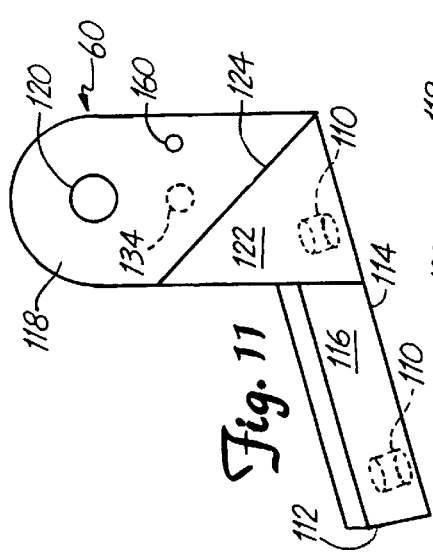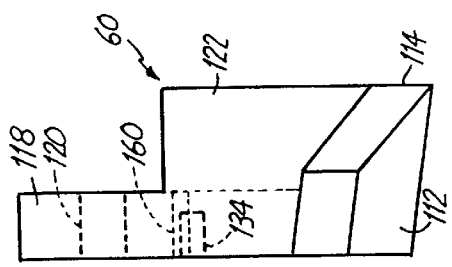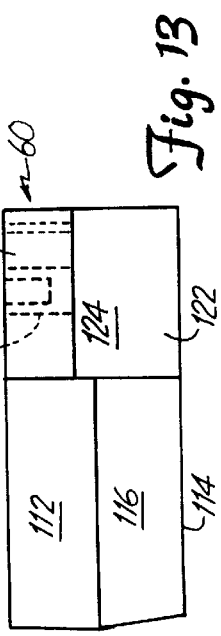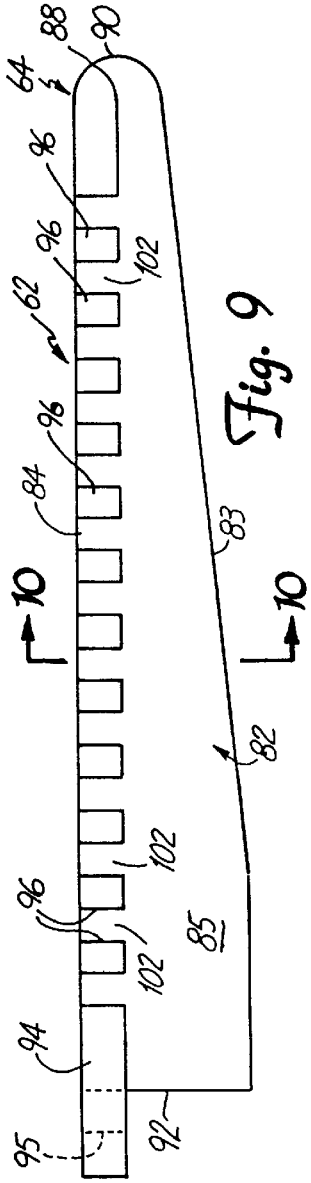

INVERTED CONE CUTTER ATTACHMENT FOR ICE AUGER

BACKGROUND OF THE INVENTION

The present invention relates to ice hole drilling equipment, and in particular to an ice hole drilling method and apparatus for forming an inverted cone at the bottom of a hole bored through an ice sheet.

Ice augers are well known in the art for drilling holes through the ice for ice fishing. A typical ice auger has one or more boring blades at the lower end of upright drive shank which has a spiral flighting along the lower portion thereof. The drive shank is rotated by manual or power means adjacent its upper end to cut down through the ice similar to the manner in which an old-fashioned hand-operated brace and bit bores a hole though wood. A typical ice auger hole is four to ten inches in diameter.

When landing either a small or large fish through the straight vertical cylindrical bored hole in the ice after the fish is hooked on a fisherman's line, the line must often take on a substantial right angle bend over the jagged edge of the ice at the bottom of the hole. Also, even if the line does not break under this strain in rough action, when the head of the hooked fish comes up against the flat ice surface adjacent the hole, the shock can oftened break the line. When the fish's head does hit the ice in that manner, the fisherman must relax the tension on the line instantaneously to allow the fish's head to move into alignment with the cylindrical hole before pulling up on the line. This instantaneous pressure release will, many times, result in the fish being able to "throw" the hook from its mouth, or this lack of pressure on the line will allow the hook to otherwise become disengaged from the fish.

Separate tools and modifications to ice augers have been proposed in order to form inverted funnel-like bottom openings to the cylindrical ice fishing hole. Typically, such tools were separate from the ice auger itself, or required significant modification to the basic structure of an ice auger.

BRIEF SUMMARY OF THE INVENTION

The present invention provides an elegantly simple and inexpensive attachment apparatus for a standard ice auger, enabling the ice auger to form an inverted cone edge at the bottom of a cylindrical ice hole previously cut through the ice by the ice auger. This is accomplished without handling a tool separate from the ice auger, and the inventive apparatus can be affixed to any standard ice auger without undue modifications.

In combination, an ice auger of the present invention includes a central shaft having a lower end and an upper end, a spiral auger blade extending integrally outwardly from the central shaft and a generally radially extending ice cutting blade removably mounted to the spiral auger blade adjacent the lower end of the central shaft. An ice hole flaring blade bracket is mounted adjacent the lower end of the central shaft. An ice hole flaring blade having an outer free end and an inner pivot end has its inner pivot end pivotally mounted to the blade bracket. The ice hole flaring blade is movable between a transport position wherein the ice hole flaring blade is aligned to project upwardly and generally parallel to the central shaft with the free end of the ice hole flaring blade extending toward the upper end of the central shaft and an operative position wherein the ice hole flaring blade is aligned to project downwardly and outwardly away from the central shaft at a desired obtuse angle with the free end of the ice hole flaring blade extending away from the upper end of the central shaft.

BRIEF DESCRIPTION OF THE DRAWINGS

The present invention will be further explained with reference to the drawing figures listed below, wherein like structure is referred to by like numerals throughout the several views.

FIG. 9 is a top elevational view of the inventive ice hole flaring blade.

FIG. 10 is a sectional view as taken along lines 10—10 in FIG. 9.

FIG. 11 is a side elevational view of the inventive blade bracket.

FIG. 12 is an end elevational view of the blade bracket, as viewed from the left in FIG. 11.

FIG. 13 is a top plan view of the blade bracket, as viewed from above in FIG. 11.

FIG. 14 is a side elevational view of the blade bracket and ice hole flaring blade assembly, as viewed from the right in FIG. 8, with the ice hole flaring blade aligned in its transport position.

While the above identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale, as it has been necessary to enlarge certain portions for clarity.

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

The sport of ice fishing takes place on frozen bodies of water. Once the ice has frozen to a sufficient depth (typically greater than 12 inches deep), it is safe to walk on the ice and even to drive vehicles on the ice, such as snowmobiles and automobiles, or to place ice fishing houses weighing hundreds of pounds on the ice. For fishing purposes, however, access must be gained to the water below the ice. Ice augers are well known tools to gain such access, and may be operated by hand-powered cranks or by motors.

Figure 1:
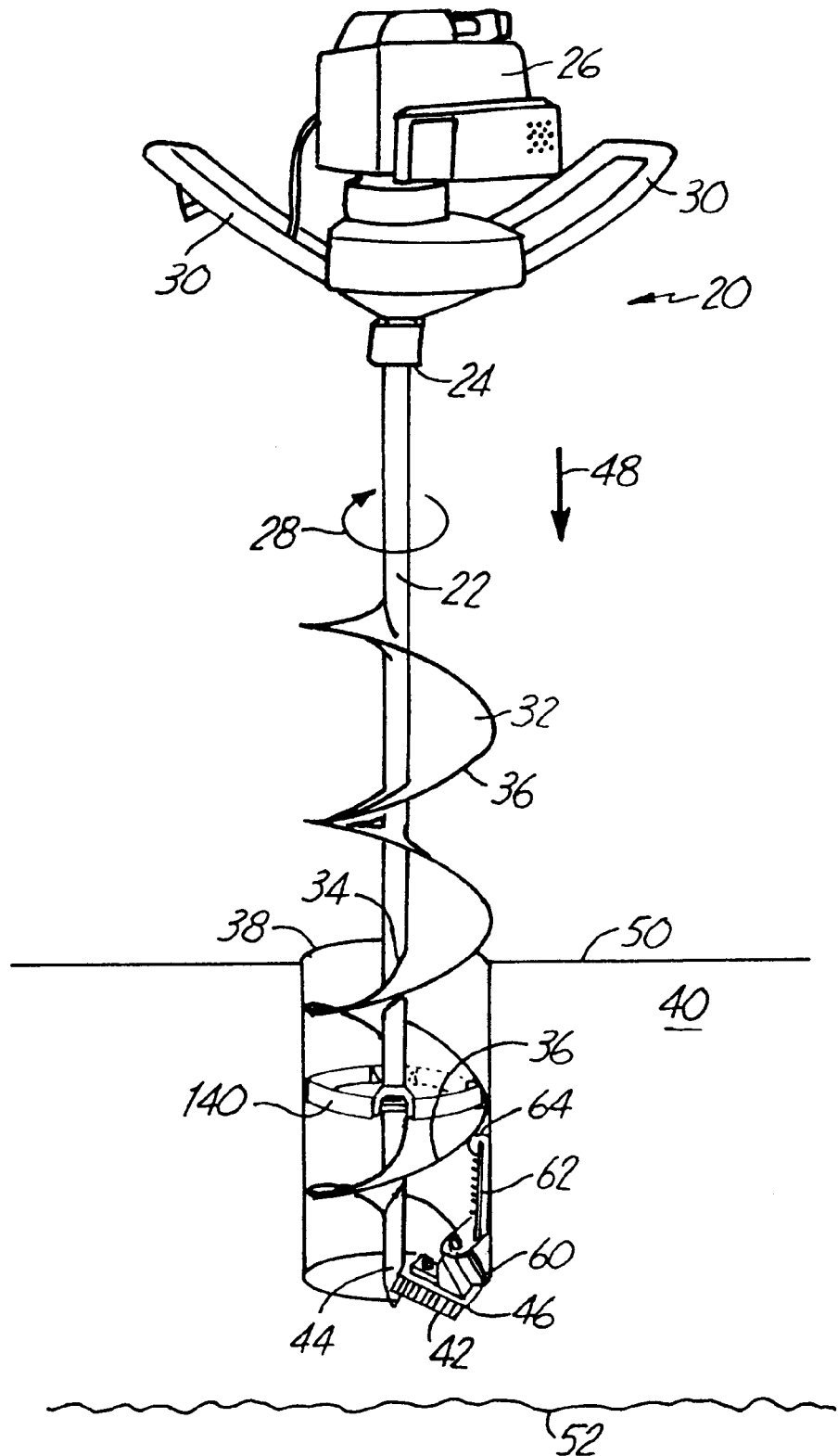
FIGS. 1–7 are side elevational views of an ice auger with the inventive ice flaring apparatus thereon, showing its sequence of operation in forming a cylindrical ice bore through an ice sheet, placing the ice hole flaring blade in an operable position, forming an inverted cone at the base of the ice bore using the inventive ice hole flaring apparatus and removing the ice auger from the flared ice hole.

An example of a motorized ice auger 20 is shown in FIG. 1. The ice auger 20 has a central shaft 22, and upper end 24 of the central shaft is coupled to a drive motor 26. Activation of the drive motor 26 by an operator causes the central shaft 22 to rotate about its axis in direction of arrow 28. Handles 30 are provided adjacent the drive motor 26 for operator manipulation of the ice auger 20.

A spiral auger blade or flighting 32 is integrally and coaxially mounted about the central shaft 22. Typically, an inner edge of the spiral auger blade 32 is welded to the central shaft 22 (as at 34). An outer circumferential edge 36 of the spiral auger blade 32 assists in defining the desired outer diameter for an ice hole 38 cut by the ice auger 20 through an ice sheet 40. The actual cutting of the ice 40 is done by a generally radially extending ice cutting blade 42 mounted adjacent a lower end 44 of the central shaft 22. The spiral auger blade 32 extends to a point adjacent the lower end 44 of the central shaft 22 and terminates at a generally radially extending bottom edge 46 thereof. The ice cutting blade 44 is mounted adjacent the bottom edge 46 of the spiral auger blade 32 and aligned to act as a leading cutting edge for the ice auger 20.

Figure 2:
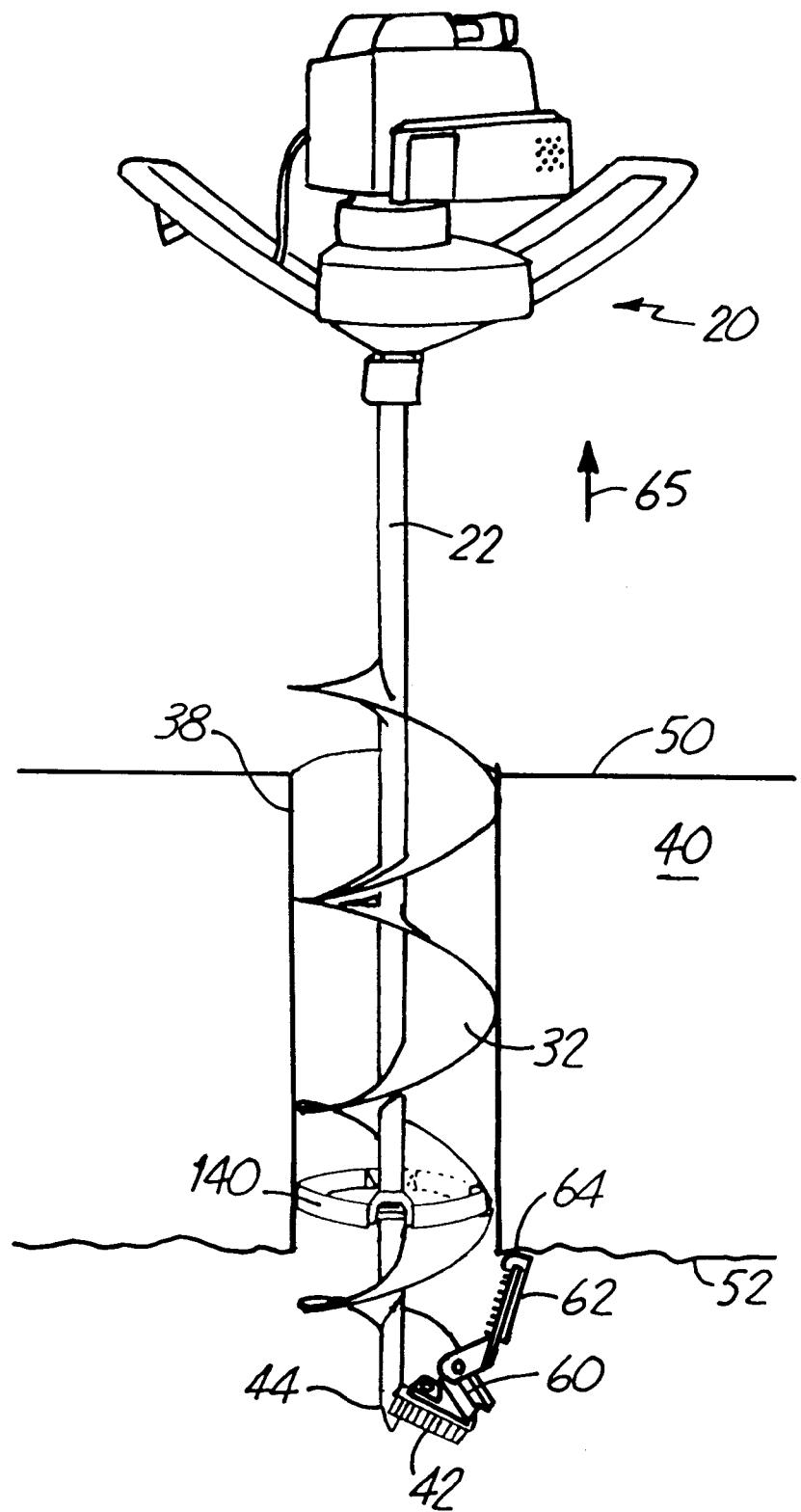
Figure 3:
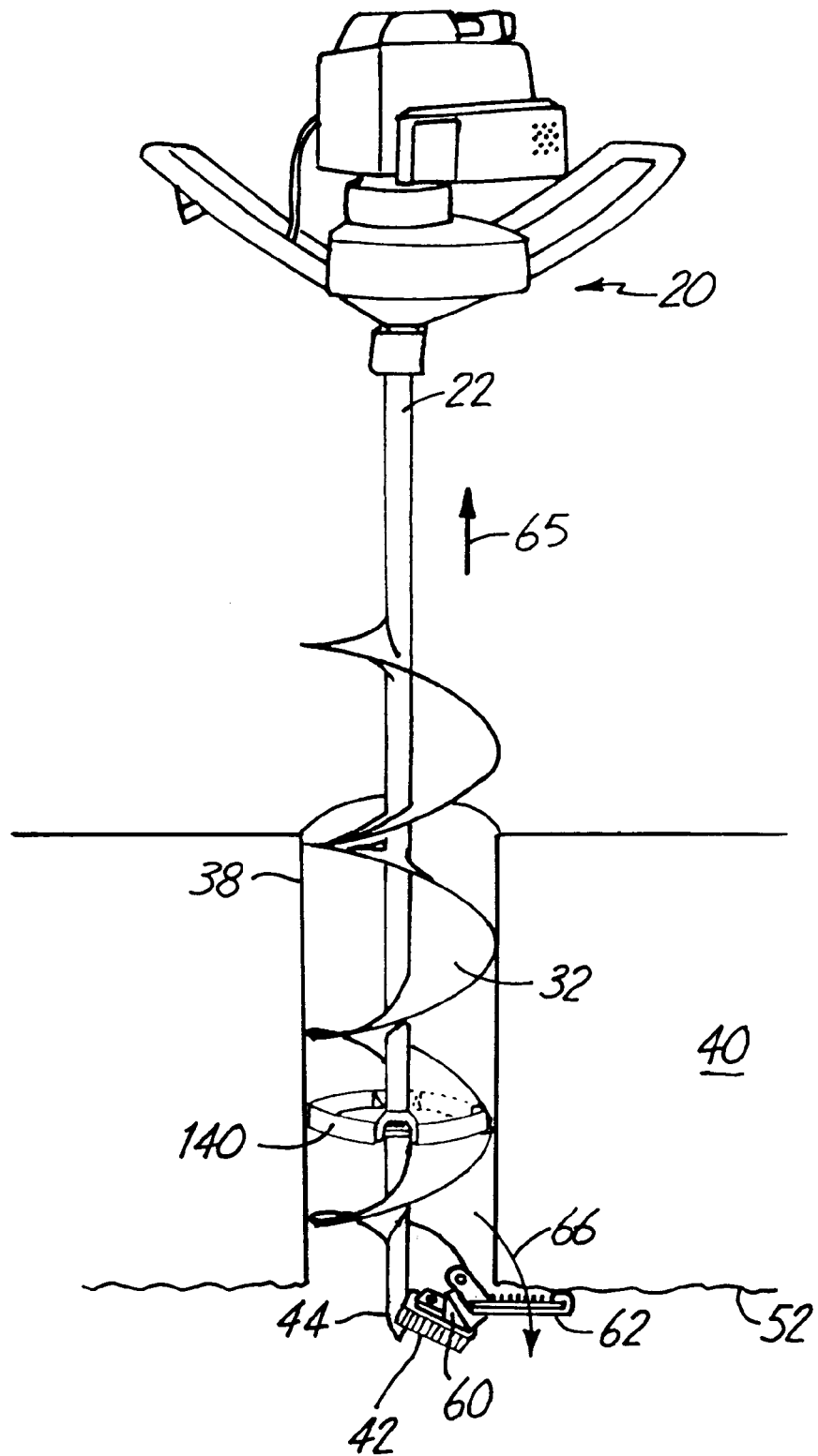

Downward pressure exerted by an operator on the ice auger 20 (in direction of arrow 48) coupled with the driven rotation of the central shaft 22, ice cutting blade 42 and spiral auger blade 32 (as indicated by arrow 28) allow the ice auger 20 to cut a cylindrical ice hole 38 through the ice sheet 40 (see FIG. 1). As shown in FIG. 2, the cutting of the ice hole 38 is complete when the lower end 44 of the central shaft 22 has completely penetrated through the thickness of the ice sheet 40 (from its top surface 50 to its bottom surface 52). During drilling through the ice, the spiral auger blade 32 acts to raise the ice chips caused by such drilling out of the ice hole 38 and deposit them on the top surface 50 alongside the hole 38. Once the ice hole 38 has been drilled completely through the ice sheet 40, the ice auger 20 may be removed, which would leave a generally cylindrical hole extending from the top surface 50 to the bottom surface 52 of the ice sheet 40.

As mentioned above, however, the formation of such an ice hole has certain disadvantages in that it creates an abrupt transition from the bottom surface 52 into the ice hole 38, which can cause problems during fishing, and particularly during the landing of a fish once it has been hooked. Accordingly, it is advantageous to form an inverted funnel along the bottom edge of the ice hole 38. The present invention allows such an inverted funnel or cone-shape to be readily and rapidly formed. No extra equipment is necessary, other than an attachment onto a standard ice auger assembly such as ice auger 20.

Figure 4:
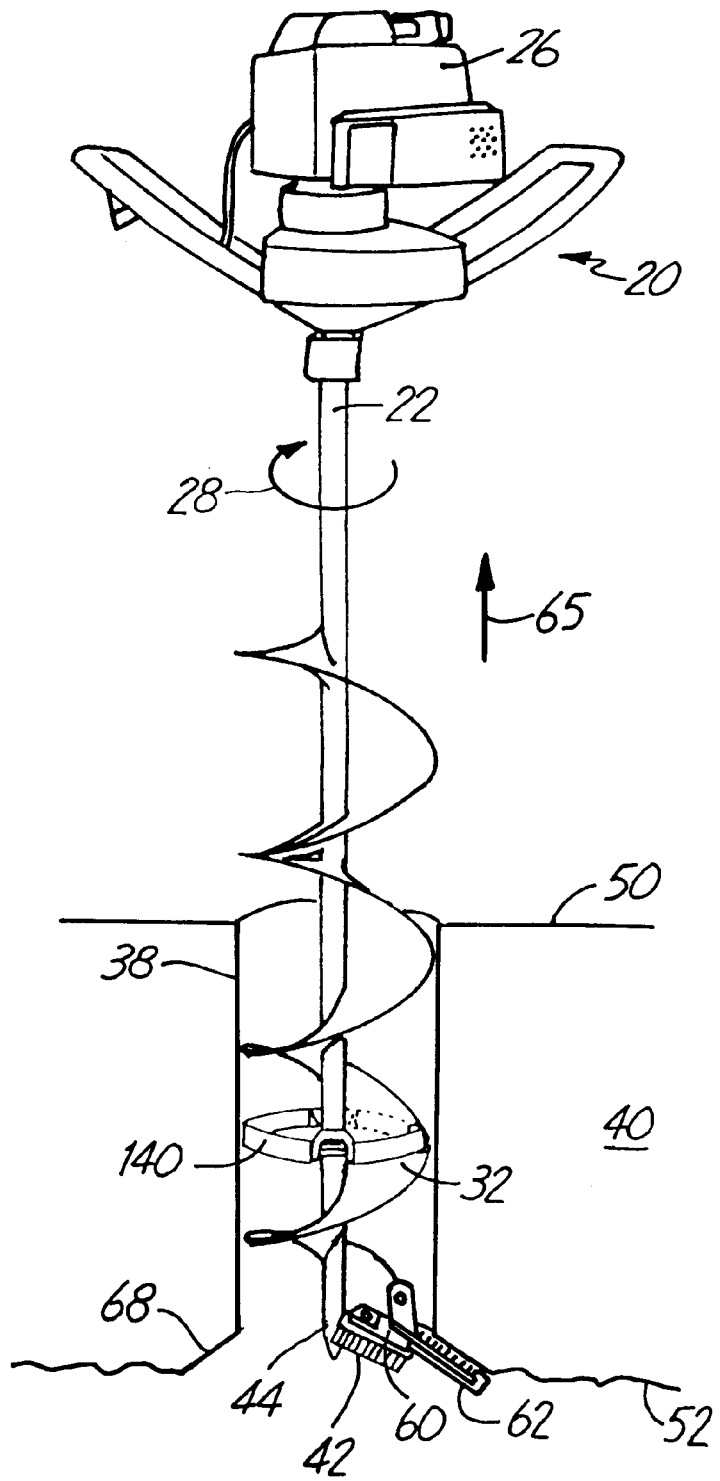

FIGS. 1–7 illustrate the inventive ice hole flaring apparatus and its method of use. In a preferred embodiment, the apparatus of the present invention includes a bracket 60 mounted adjacent the ice cutting blade 42 at the lower end 44 of the central shaft 22. The blade bracket 60 provides a pivotal mounting base for an ice hole flaring blade 62 which is movable between two positions, a transport position (FIG. 1) and an operable position (FIG. 4).

FIG. 1 illustrates the position of the ice flaring blade 62 during the initial boring of the ice auger 20 through the ice sheet 40. The ice hole flaring blade 62 is biased by spring means toward the position illustrated in FIG. 1, with an outer free end 64 thereof extending toward the upper end 24 of the central shaft 22. In this position, the ice hole flaring blade 62 is aligned generally parallel with the central shaft 22 and has a portion thereof urged toward the outer edge 36 of the spiral auger blade 32 because of the closeness of the just drilled ice hole 38. In its desired transport position, the outer free end 64 of the ice hole flaring blade 62 is spaced approximately one inch radially from the outer edge 36 of the spiral auger blade 32. Upon breaking through the ice sheet 40 and continued urging downwardly of the ice auger 20 (in direction of arrow 48), the outer free end 64 of the ice hole flaring blade 62 is below the bottom surface 52 of the ice sheet 40. Once the ice hole flaring blade 62 is unconstrained by the cylindrical walls of the ice hole 38, it reassumes the desired spacing of its outer free end 64 relative to the spiral auger blade 32. Withdrawal of the ice auger 20 from the ice hole (in direction of arrow 65 in FIG. 2), causes the outer free end 64 to engage the bottom surface 52. Continued upward withdrawal of the ice auger 20 from the ice hole 38 overcomes the biasing force of the spring on the ice hole flaring blade 62, and it pivots downwardly relative to the blade bracket 60 (as indicated by arrow 66 in FIG. 3). Downward pivoting of the ice hole flaring blade 62 continues until it reaches a pivot limit stop defined by the blade bracket 60 and is placed in its operable position for ice flaring (see FIG. 4). In this position, the ice hole flaring blade 62 extends downwardly and radially outwardly relative to the central shaft 22.

Once the ice hole flaring blade has been placed in its operable position (FIG. 4), the drive motor is again activated, while the operator continues to urge the ice auger 20 in direction of arrow 65. This rotates the ice hole flaring blade 62 against the ice 40 (in direction of arrow 28), and causes the formation of an inverted cone or funnel-shaped opening 68 which is generally coaxial with the cylindrical bore 38. The size of the funnel-shaped opening 68 is as large as the radial extension of the ice hole flaring blade 62 will allow, as illustrated in FIG. 4.

Figure 5:
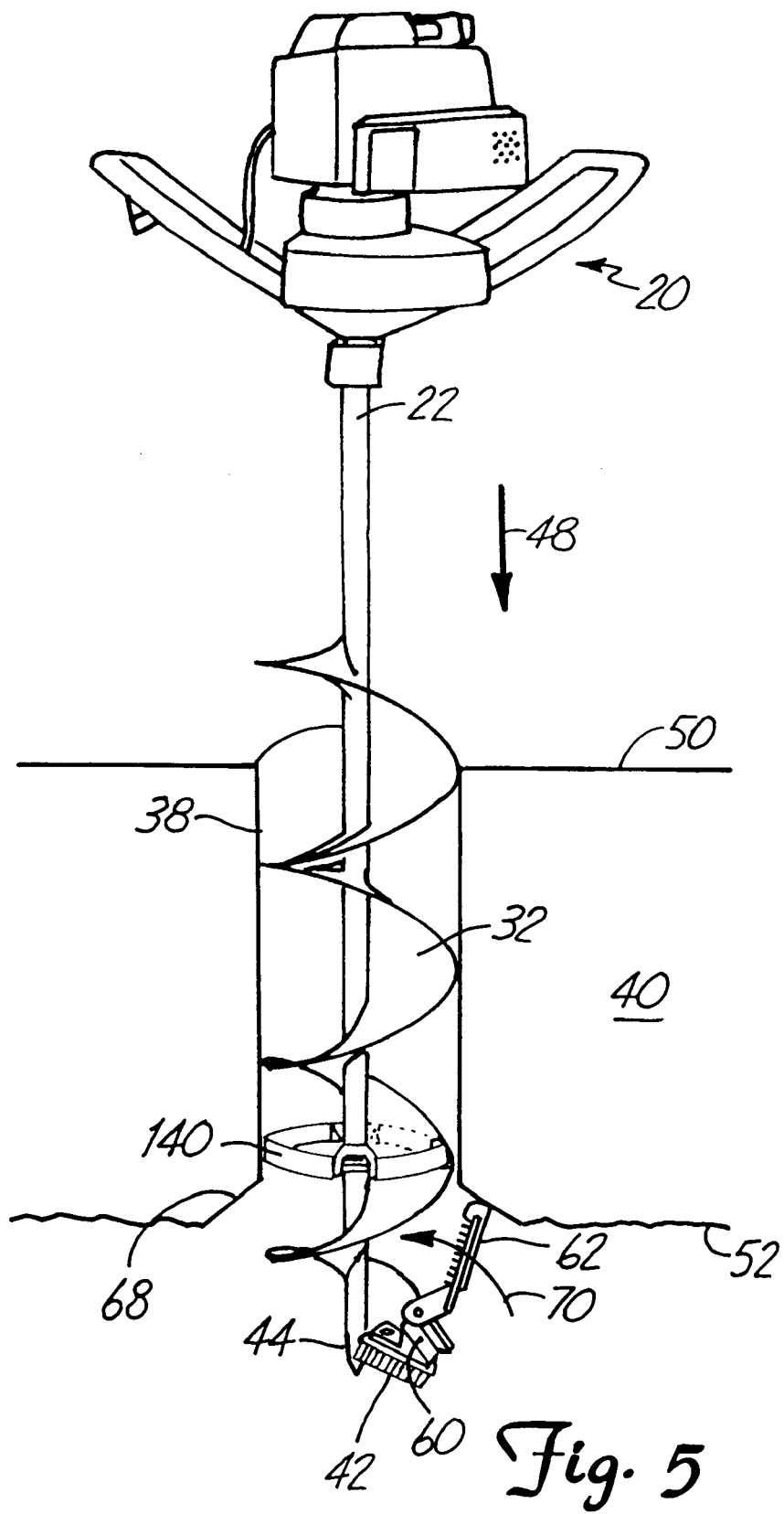
Figure 6:
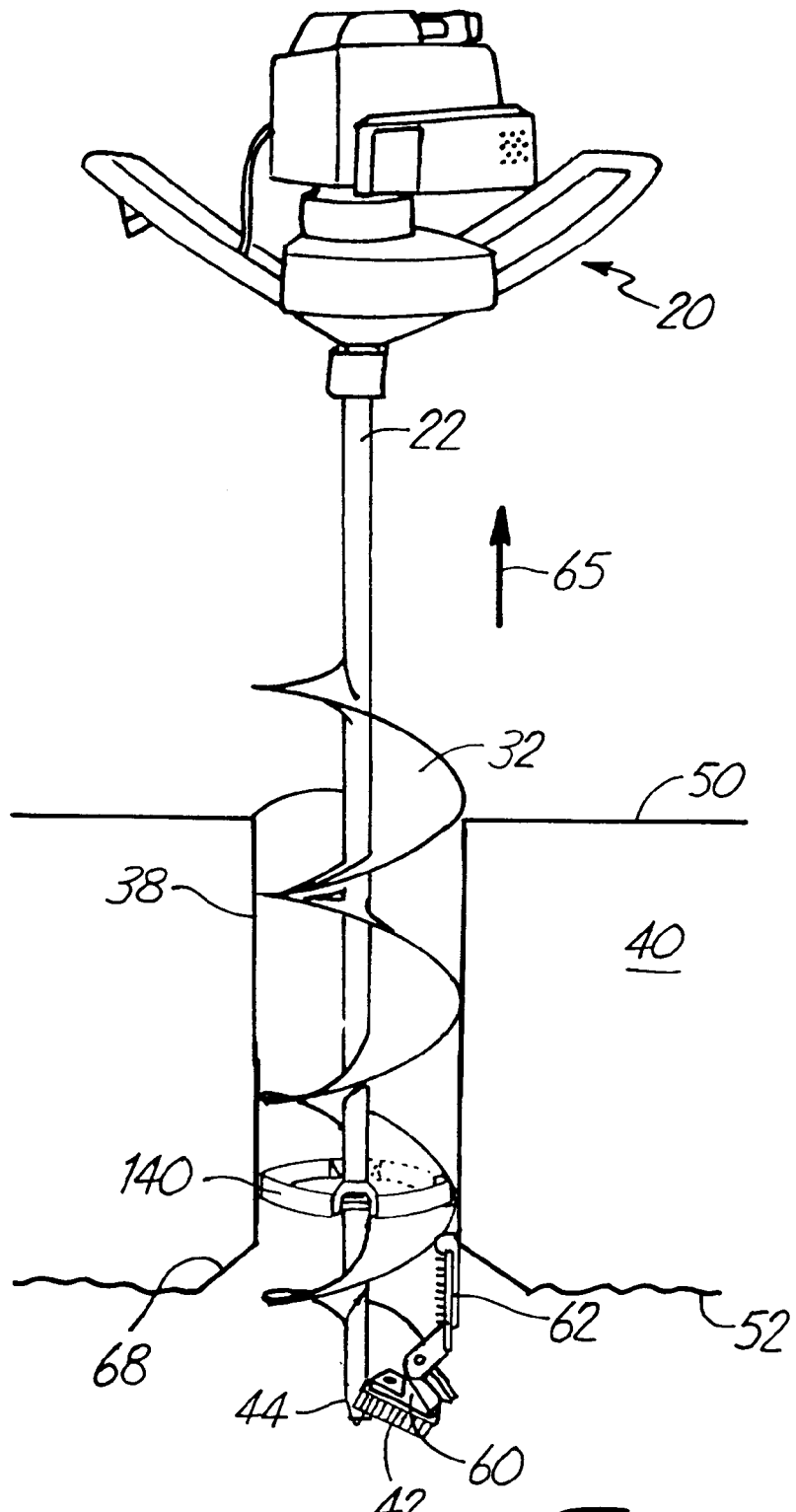
Figure 7:
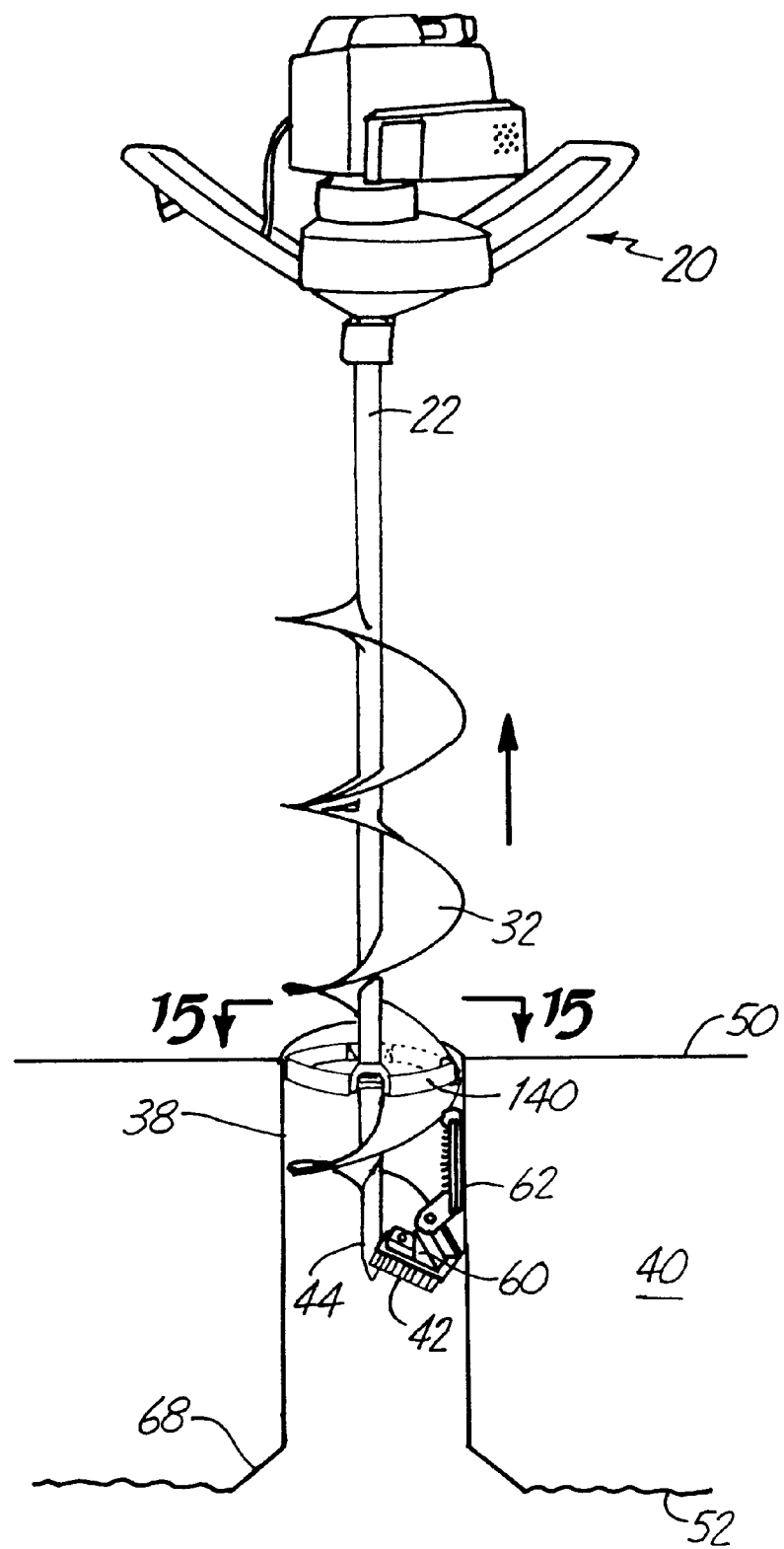

Once the desired funnel-shaped opening 68 has been formed, the drive motor 26 is deactivated, and the ice auger 20 again urged in downwardly in direction of arrow 48 (FIG. 5). As the ice hole flaring blade 62 is pushed away from the bottom surface 52 of the ice sheet 40, the spring acting thereon pivots it upwardly (in direction of arrow 70) back toward its transport position. The outer free end 64 is rounded to facilitate the movement of the ice hole forming blade 62 upwardly and radially inwardly as it engages the face of the inverted funnel-shaped opening 68. Finally, the ice auger 20 is withdrawn in direction of arrow 65, with the ice hole flaring blade 62 in its transport position (FIGS. 6 and 7) and folded up and out of the way as the lower portion of the ice auger 20 is withdrawn through the cylindrical ice hole 38. The end result is a cylindrical ice hole 38 of a desired diameter, with a larger diameter inverted funnel-shaped opening 68 at a lower end thereof. A fisherman can then proceed to bait his hook and drop it and the attached line into the ice hole 38 with the assurance that there will be much less chance lost fish because of dislodging the hook from the fish or breaking of the line due to the shape of the ice fishing hole.

The ice hole flaring apparatus of the present invention is particularly advantageous because it can be provided as an after-market attachment for a standard ice auger. No special ice auger, or hole-forming tool separate from an ice auger, is necessary. In addition, the inventive apparatus is relatively lightweight, and does not significantly interfere with the operation of the standard ice auger in cutting a cylindrical ice hole. Minimizing the size of the ice hole flaring apparatus components is important, since any obstruction along the path of the spiral auger blade causes ice chips to build up and adversely affects the efficiency of an ice auger. The ice hole flaring apparatus of the present invention is relatively low profile and does not unduly interfere with movement of the ice chips along the spiral auger blade of an ice auger.

Figure 8:
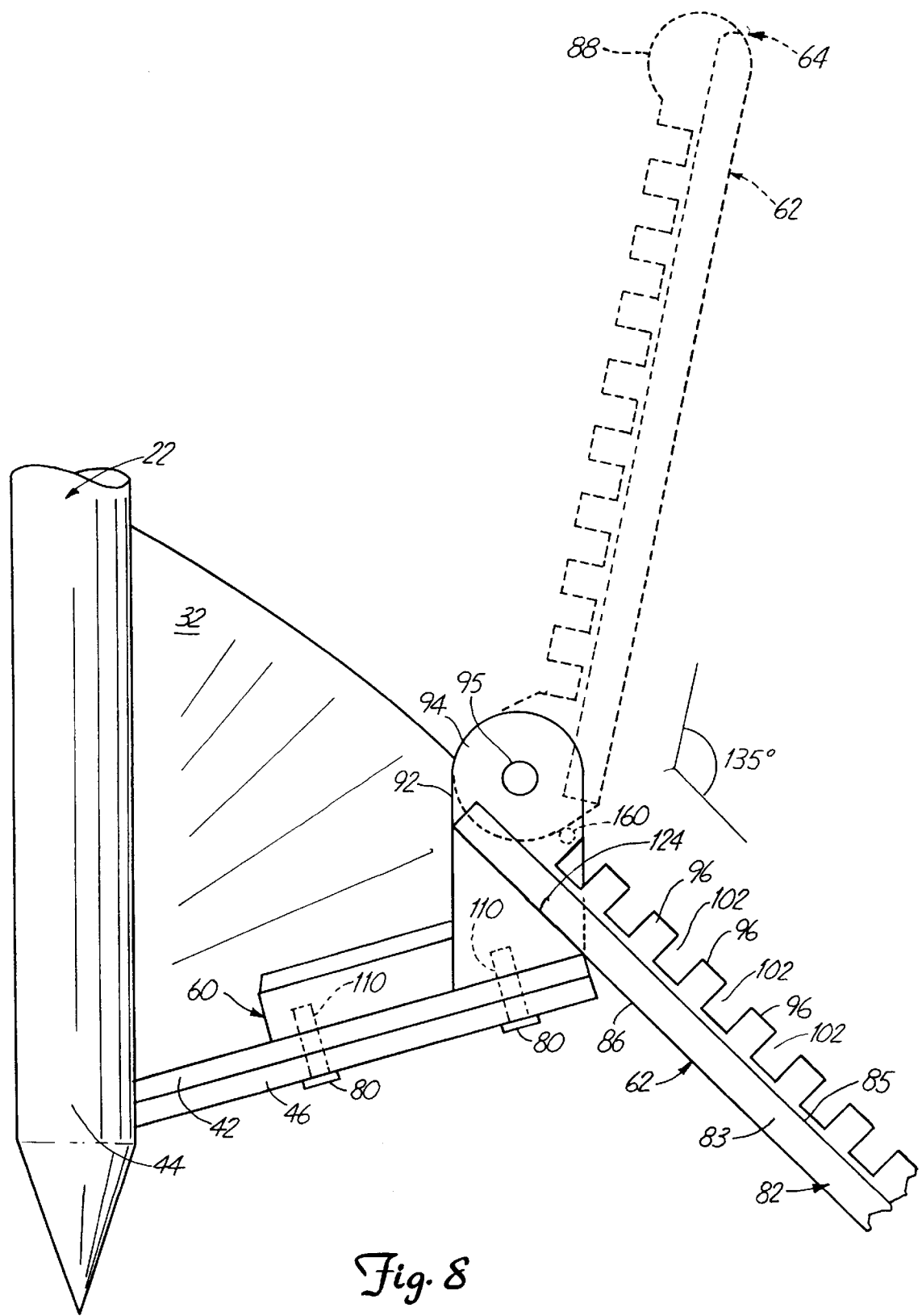
FIG. 8 is an enlarged side elevational view of the ice hole flaring blade and its associated blade bracket mounted on the lower end of a spiral auger blade of the ice auger.
Figure 15:
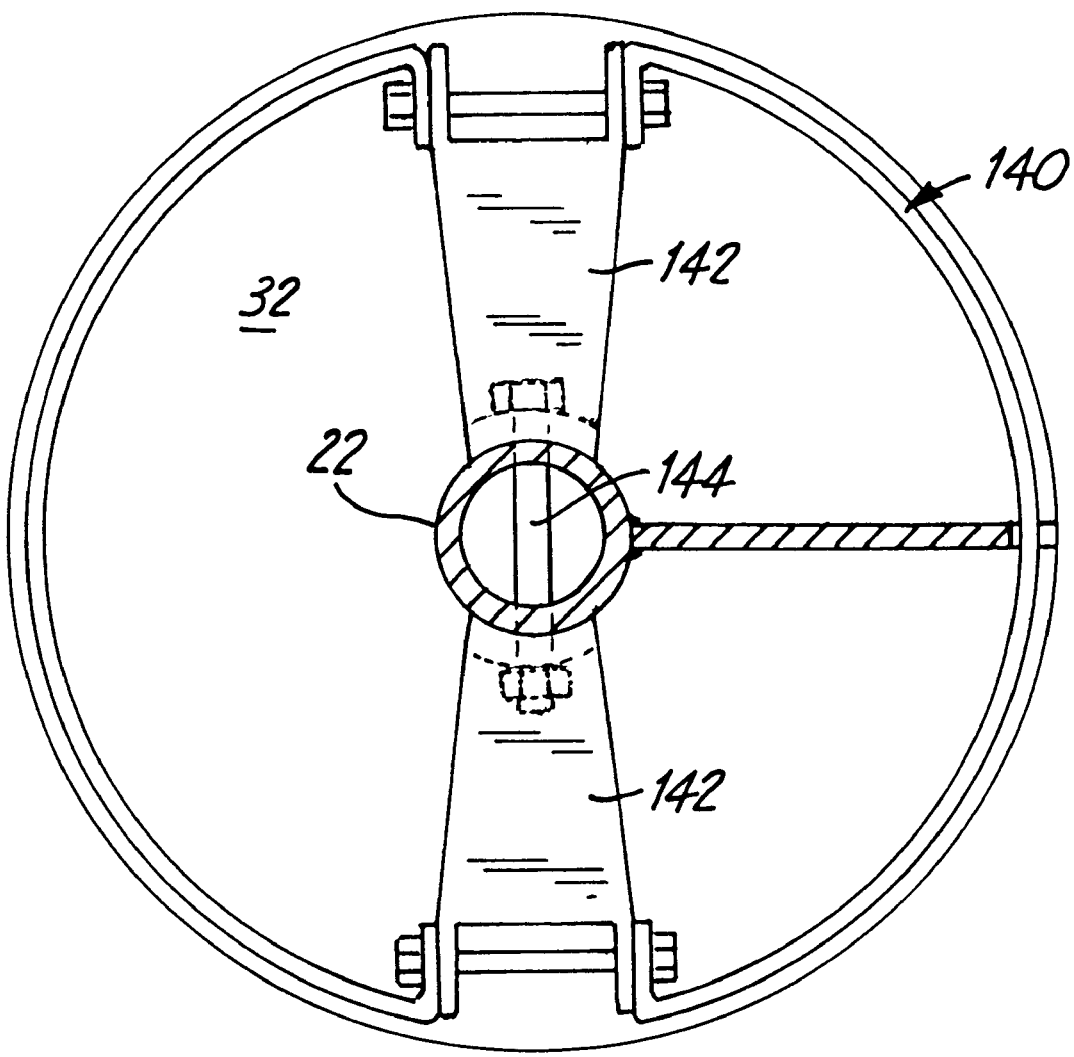
FIG. 15 is a sectional view as taken along lines 15—15 in FIG. 7.

FIG. 8 illustrates in greater detail the blade bracket 60 and ice hole flaring blade 62, and their preferred attachment adjacent the lower end 44 of the central shaft 22. Typically, an ice auger 20 has a removable ice cutting blade 42 affixed along the bottom edge 46 of its spiral auger blade 32. The ice cutting blade 42 is typically mounted to the spiral auger blade 32 by suitable mechanical fasteners, such as a pair of threaded fasteners 80. As with any cutter, after a period of use the ice cutting blade 42 becomes dull and replacement or sharpening is thus necessary, and can be accommodated by means of the removable threaded fasteners 80.

As best seen in FIGS. 9 and 10, the blade 62 has a base portion 82 having a leading edge 83, a trailing edge 84, a top surface 85 and a bottom surface 86. The outer free end 64 of the ice hole flaring blade 62 is rounded, as at 88 (FIG. 8) and 90 (FIG. 9), to facilitate smooth movement of the ice hole flaring blade 62 over the face of the ice hole 38, bottom surface 52 of the ice sheet 40 and the sloped face of the formed inverted cone-shaped opening 68.

The ice hole forming blade 62 has an inner pivot end 92, with a blade pivot flange 94 thereon. The blade pivot flange 94 extends upwardly from the top surface 85 of the base portion 82, as does the rounded area 88, and has a pivot hole 95 therethrough for pivotal mounting to the blade bracket 60. Between the blade pivot flange 94 and the rounded area 88, the ice hole flaring blade 62 has a plurality of upstanding ice cutting teeth 96 thereon. Preferably, each tooth 96 has a sloped front face 98 (at a 45° angle relative to the top surface 85 of the base portion 82) and a flat ice cutting upper edge 100. In a preferred embodiment, adjacent teeth 96 are spaced apart by an opening 102 equal to the width of the teeth 96 (as best illustrated in FIG. 8).

The blade bracket 60 is mounted on the bottom edge 46 of the spiral auger blade 32 by means of countersunk threaded bores 110 therein, which are adapted to mate with the threaded fasteners 80. The blade bracket 60 is illustrated in greater detail in FIGS. 11–14. The blade bracket 60 has a base portion 112, which on a leading side 114 thereof, has a sloped front face 116 (to facilitate movement of the blade bracket 60 through the chipped ice during cutting). The base portion 112 defines that portion of the blade bracket 60 which is radially closest to the central shaft 22. A radially outer portion of the blade bracket 60 has an upstanding bracket pivot flange 118, with a pivot hole 120 therethrough for pivotal mounting to the ice hole flaring blade 62. The bracket pivot flange 118 is adapted to mate with the blade pivot flange 94, as illustrated in FIG. 14, and the respective pivot holes 95 and 120 are aligned for reception of a suitable pivot pin or removable fastener, such as fastener 126. The blade bracket 60 has an upstanding portion 122 adjacent the bracket pivot flange 118 which has an outwardly facing sloped blade stop face 124. As best seen in FIG. 8, the stop face 124 engages the bottom surface 86 of the base portion 82 of the ice hole flaring blade 62 to define the operable position of the ice hole flaring blade 62 (seen in solid lines in FIG. 8). Preferably, the sloped stop face 124 is aligned to present the ice hole flaring blade at an obtuse angle of 135° relative to the axis of the central shaft 22. An ice hole flaring blade 62 extended in this configuration for cutting the ice thus forms a 45° inverted funnel area adjacent the bottom end of the ice hole 38.

In FIG. 8, the ice hole flaring blade is shown in it transport position in dashed lines. The ice hole forming blade 62 is biased toward its transport position by spring means, such as a torsion spring 128 wrapped about the pivot fastener 126 and having its free ends 130 and 132 secured within suitable holes 134 and 136 in the blade bracket 60 and ice hole flaring blade 62, respectively. While a torsion spring 128 is illustrated, other bias means will suffice (such as, for example, a leaf spring, a spiral spring or other such resilient members or devices) so long as it provides sufficient bias force to urge the ice hole flaring blade 62 toward its transport position.

In its transport position, the ice hole flaring blade 62 is aligned to project upwardly and generally parallel to the central shaft 22 (with the outer free end 64 of the ice hole flaring blade 62 extending toward the upper end 24 of the central shaft 22). The spring 128 urges the ice hole flaring blade 62 toward this transport position. In its operative position, the ice hole flaring blade 62 is aligned to project downwardly and outwardly away from the central shaft 22 at a desired obtuse angle (with the outer free end 64 of the ice hole flaring blade 62 extending away from the upper end 24 of the central shaft 22). Preferably, the outer free end 64 of the ice hole flaring blade 62 extends below the lower end 44 of the central shaft 22 when the ice hole flaring blade 62 is in its operable position (e.g., as illustrated in FIGS. 4 and 8). In this operable position, the teeth 96 on the ice hole flaring blade 62 are aligned generally radially relative to the central shaft 22.

In the embodiment illustrated in FIGS. 1–7, the outer free end 64 of the ice hole flaring blade 62 extends upwardly (in its transport position) to engage the outer edge 36 of the spiral auger blade 32 directly above it (see FIG. 2). Preferably, the bias means operates to maintain a spacing of approximately one inch radially between the outer edge 36 and the ice hole flaring blade 62. The torsion spring 128 may be formed to maintain this spacing, or alternatively, a second counter spring may be provided to do so or it may be accomplished by means of a compression member (e.g., a rubber bumper) mounted on the blade bracket 60. This spacing may be compromised during insertion and removal of the ice auger into a cylindrical bore 38 (see, e.g., FIGS. 1, 6 and 7). It is contemplated that a longer ice hole flaring blade could be provided. In this case, it may be necessary to remove one or two teeth on the blade to allow it to be pivoted upwardly and inwardly sufficiently relative to the spiral auger blade to permit ready insertion and removal within the cylindrical ice hole.

The upwardly extending orientation of the ice cutting teeth 96 on the ice hole flaring blade 62 results in the teeth 96 being pulled across the ice during formation of the inverted funnel-shaped opening 68 (see, e.g., FIG. 4). This is believed to have a fracturing effect on the ice instead of a pure cutting effect, and has proved to work quite well to achieve rapid and efficient ice removal.

The use of the ice hole flaring blade 62 extending outwardly from one side of a rotating central shaft 22 for cutting the inverted ice funnel will result in extensive chatter as the ice hole flaring blade 62 eccentrically engages the ice. Such chatter is compensated by providing stabilizing means on the ice auger 20 about the ice hole flaring blade 62. In one embodiment (e.g., FIGS. 1–7 and 15), such a stabilizer is an annular ring 140. The ring 140 is supported coaxially about the central shaft 22 by a pair of radially opposed brackets 142 secured by a fastener 144 to the central shaft 22. The ring 140 is approximately the same diameter as that defined by the cylindrical ice hole 38 formed by the ice auger 20. As illustrated in FIG. 4, the ring 140 is mounted on the central shaft 22 above the ice hole flaring blade 62 a sufficient distance so that it is within the cylindrical ice hole 38 while the ice hole flaring blade 62 is in its operable position for forming the inverted funnel-shaped opening 68. The ring 140 thus serves to engage the inner sides of the cylindrical ice hole 38 and retain the ice auger 20 in a coaxial relation with respect to the ice hole 38 during the forming of the inverted funnel-shaped opening 68 with the ice hole flaring blade 62.

Figure 16:
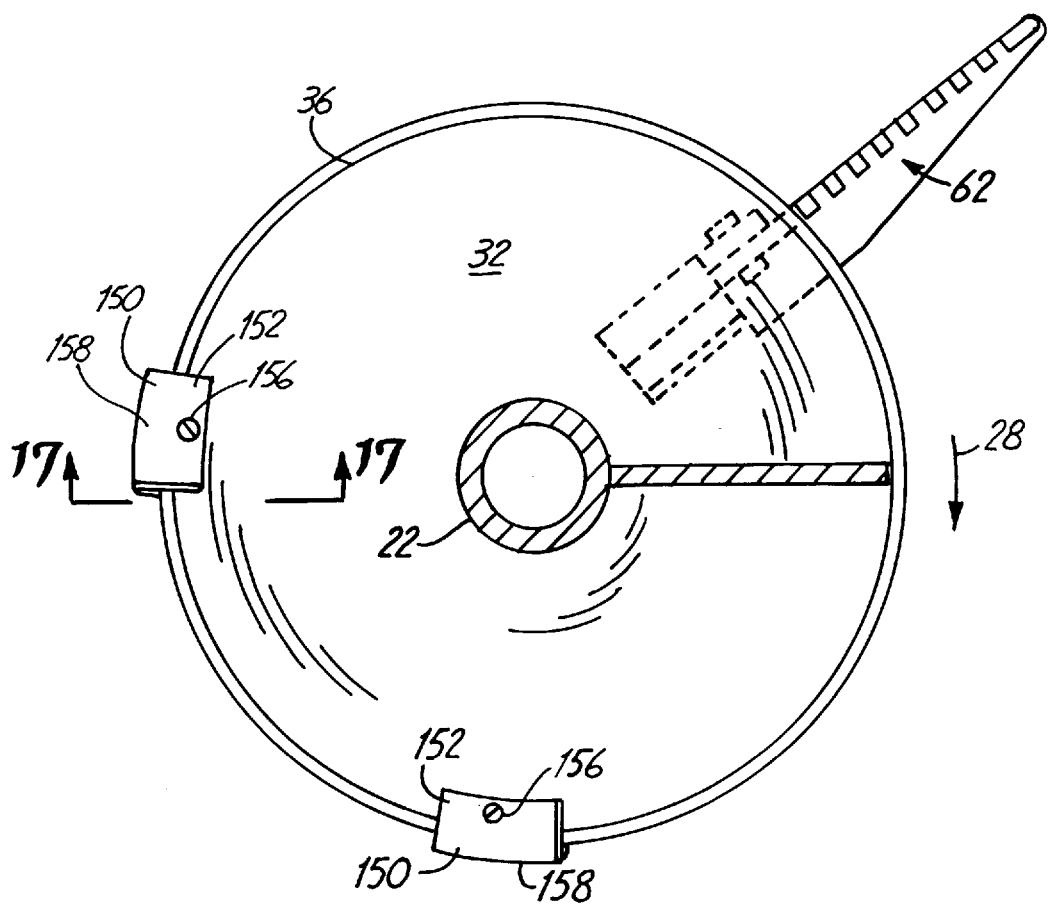
FIG. 16 is a sectional view of an alternative embodiment of the ice hole flaring apparatus of the present invention.
Figure 17:
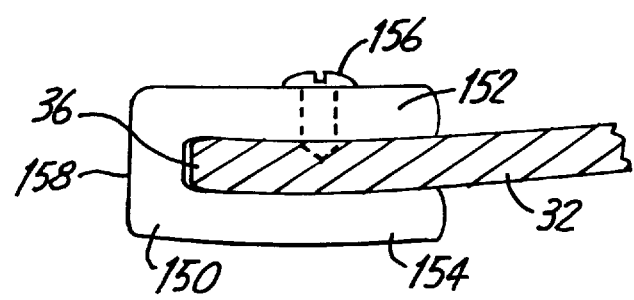
FIG. 17 is a sectional view as taken along lines 17—17 in FIG. 16.

An alternative stabilizer for this purpose is illustrated in FIGS. 16 and 17. In this embodiment, two or more stabilizer shoes 150 are affixed along the outer edge 36 of the spiral auger blade 32. Each stabilizer shoe 150 is formed by a U-shaped member which has an upper leg 152 and a lower leg 154. The stabilizer shoe 150 is placed over the outer edge 36 of the spiral auger blade 32 and a self-tapping fastener 156 is used to affix the stabilizer shoe 150 to the spiral auger blade 32. An outer portion 158 of the stabilizer shoe 150 thus provides additional radial dimension for the spiral auger blade 32. The stabilizer shoes 150 are oriented relative to the ice hole flaring blade 62 circumferentially in an equidistant relation. For example, in FIG. 16, two stabilizer shoes 150 are provided, and they are spaced 120° apart and each is spaced 120° from the ice hole forming blade 62 relative to the axis of the central shaft 22. The stabilizer shoes 150 are also spaced upwardly from the ice hole flaring blade 62 so that when the ice hole flaring blade 62 is in use to form an inverted funnel-shaped opening 68, the stabilizer shoes 150 are within the previously formed cylindrical ice hole 38. In use, the stabilizer shoes 150 engage the inner surface of the ice hole 38 opposite the ice hole flaring blade 62 to reduce chatter and maintain the ice auger 20 in a coaxial relation with respect to the ice hole 38 during formation of the inverted funnel-shaped opening 68.

Figure 18:
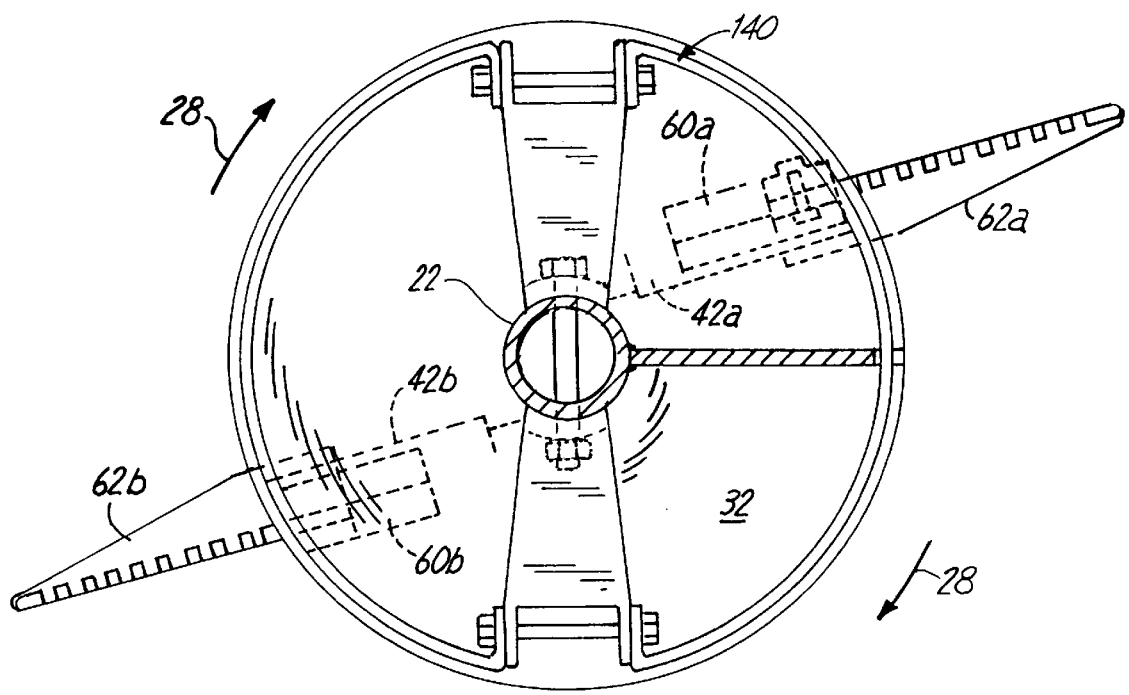
FIG. 18 is a sectional view of an ice auger bearing another alternative embodiment of the ice hole flaring apparatus of the present invention.

Many ice augers have two ice cutting blades at the lower end thereof. As illustrated in FIG. 18, a first ice cutting blade 42a is mounted on the bottom edge of the spiral auger blade of the ice auger, while a second ice cutting blade 42b is mounted on a bracket extending generally 180° across from the first ice cutting blade 42a. In those dual blade ice augers, each blade is removable and replaceable. FIG. 18 further illustrates an embodiment of the present invention adapted for providing dual ice hole flaring blades 62a and 62b. In this embodiment, each ice hole flaring blade 62 has a respective blade bracket 60a and 60b, which is mounted on the ice auger as described above. In other words, the fasteners used to fasten the ice cutting blades 42a and 42b are also used to fasten the blade brackets 60a and 60b. In this embodiment, a stabilizer, such as stabilizer ring 140, is again provided to maintain the ice auger in coaxial position during use.

In some instances, it may be desirable to restrain the ice hole flaring blade 62 from pivoting downwardly and outwardly relative to the blade bracket 60. A hole 160 is provided in the blade pivot flange 94 of the blade bracket 60 for this purpose (see FIG. 8). When the ice hole flaring blade is placed in its transport position (as shown in dashed lines in FIG. 8), the hole 160 is exposed. A hitch clip 162 (FIG. 14) or other suitable fastener may then be inserted into the hole and retained therein. Such a fastener essentially prevents pivotal movement of the ice hole flaring blade 62 relative to the blade bracket 60, thereby retaining it in its upright transport position.

Preferably, the components of the inventive ice hole flaring attachment are formed from cold rolled steel. These components are preferably chrome plated to enhance appearance and mitigate corrosive effects.

Although the present invention has been described with reference to preferred embodiments, workers skilled in the art will recognize that changes may be made in form and detail without departing from the spirit and scope of the invention. For example, while the ice hole forming blade is illustrated as being mounted on a bracket adjacent the ice cutting blade, it is contemplated that the ice hole forming blade could be mounted directly to the central shaft at a point above the ice cutting blades by a suitable mounting bracket extending radially from the central shaft. Further, alternative teeth configurations may have advantages in some conditions. For example, it may be advantageous to change from a teeth arrangement where all teeth have sloped front faces to an arrangement where alternative teeth have sloped back faces and vertical front faces. Further, in order to make the ice hole flaring apparatus invention more universal, it is contemplated that the blade bracket have a plurality of threaded bores or fastener receptacles so that a single bracket may be adaptable for use with ice augers that vary in size and manufacturer (and consequently vary in placement of the ice cutting blade fasteners 80). Further, it is understood that some ice augers operate clockwise, while others operate in a counterclockwise manner. The present invention may be reversed in form to be adaptable to either type of ice auger.

We claim:

1. An ice auger comprising:
   a central shaft having a lower end and an upper end;
   a spiral auger blade extending integrally outwardly from the central shaft;
   a generally radially extending ice cutting blade removably mounted to the spiral auger blade adjacent the lower end of the central shaft;
   an ice hole flaring blade bracket mounted adjacent the lower end of the central shaft;
   an ice hole flaring blade having an outer free end and an inner pivot end, the ice hole flaring blade having its inner pivot end pivotally mounted to the blade bracket, the ice hole flaring blade being movable between a transport position wherein the ice hole flaring blade is aligned to project upwardly and generally parallel to the central shaft with the free end of the ice hole flaring blade extending toward the upper end of the central shaft and an operative position wherein the ice hole flaring blade is aligned to project downwardly and outwardly away from the central shaft at a desired obtuse angle with the free end of the ice hole flaring blade extending away from the upper end of the central shaft.

2. The ice auger of claim 1 wherein the ice hole flaring blade has a blade body with a plurality of upwardly extending teeth which are aligned generally radially relative to the central shaft.

3. The ice auger of claim 2 wherein each tooth has a forwardly ramped ice cutting face.

4. The ice auger of claim 2 wherein each tooth has a flat ice cutting edge.

5. The ice auger of claim 1 wherein the outer free end of the ice hole flaring blade is rounded.

6. The ice auger of claim 1, and further comprising:
a first spring mounted between the ice hole flaring blade and the blade bracket which biases the ice hole flaring blade toward its first transport position.

7. The ice auger of claim 1 wherein the blade bracket is removably mounted to the spiral auger blade adjacent the lower end of the central shaft.

8. The ice auger of claim 1 wherein the ice hole flaring blade has a bottom surface and the blade bracket has a stop face, and wherein the ice hole flaring blade is in its operative position when the bottom surface thereof abuts the stop face on the blade bracket.

9. The ice auger of claim 1, and further comprising:
bias means for urging the ice hole flaring blade into its transport position.

10. The ice auger of claim 1, and further comprising:
an ice hole flaring stabilizer mounted relative to the central shaft.

11. The ice auger of claim 10 wherein operation of the ice cutting blade defines an ice cut having a first diameter, and wherein the ice hole flaring stabilizer is a ring extending coaxially about the central shaft and being of generally the first diameter.

12. The ice auger of claim 10 wherein the ice hole stabilizer comprises one or more radial spacer shoes mounted on an outer rim edge of the spiral auger blade and spaced generally equally circumferentially about the central shaft relative to the ice hole flaring blade.

13. The ice auger of claim 10 wherein the ice hole flaring stabilizer is spaced from blade bracket along the central shaft.

14. The ice auger of claim 10 wherein the ice cutting blade is shaped to define an ice cut having a first diameter, and wherein the ice hole flaring stabilizer extends coaxially about at least a portion of the central shaft and has a diameter approximately the same as the first diameter.

15. The ice auger of claim 1 wherein the free end of the ice hole flaring blade extends below the lower end of the central shaft when the ice hole flaring blade is in its operable position.

16. The ice auger of claim 1, and further comprising:
locking means for selectively maintaining the ice hole flaring blade in its transport position.

17. The ice auger of claim 1 wherein the central shaft has two circumferentially opposed ice cutting blades, two circumferentially opposed ice hole flaring blade brackets and two circumferentially opposed ice hole flaring blades.

18. The ice auger of claim 1 wherein the central shaft has two circumferentially opposed ice hole flaring blade brackets mounted thereto, with each ice hole flaring blade bracket having a corresponding ice hole flaring blade pivotally mounted thereon.

19. An ice hole flaring attachment for an ice auger which has a central shaft having an axis and an upper end and a lower end, a spiral auger blade extending integrally and radially outwardly along the central shaft, a generally radially extending ice cutting blade removably mounted to the spiral auger blade adjacent the lower end of the central shaft and drive means for rotating the central shaft about its axis, the ice hole flaring attachment comprising:

an ice hole flaring blade bracket mounted adjacent the ice cutting blade adjacent the lower end of the central shaft; and an ice hole flaring blade having an outer free end and an inner pivot end, the ice hole flaring blade being pivotally mounted to the blade bracket and movable between a transport position wherein the ice hole flaring blade is aligned above the ice cutting blade and has its free end extending toward the upper end of the central shaft and an operable position wherein the ice hole flaring blade is aligned generally below the ice cutting blade and has its free end extending downwardly from the central shaft.

20. The ice hole flaring attachment of claim 19, and further comprising:
bias means for urging the ice hole flaring blade toward its transport position.

21. The ice hole flaring attachment of claim 19, and further comprising:
stop means for defining the operable position of the ice hole flaring blade relative to the blade bracket.

22. A method for flaring a bottom side of a hole in a sheet of ice, the method comprising:

attaching a first ice-hole flaring bracket adjacent a lower end of a central shaft on a spiral ice auger, the first ice-hole flaring bracket pivotally holding a first removable ice-hole flaring blade having a free end and a pivot end pivotally attached to the ice-hole flaring bracket, the first ice-hole flaring blade being movable between a transport position wherein the ice-hole flaring blade projects upwardly generally parallel to the central shaft, and an operating position wherein the ice-hole flaring blade extends outward from the shaft at a desired obtuse angle;

rotating the central shaft of the ice auger to create a hole in the sheet of ice with the blade in the transport position;

urging the ice auger downwardly until the blade is in the operating position;

urging the auger upwardly to engage the bottom of the ice sheet with the blade; and fracturing the ice sheet with the blade to create a desired flare on the bottom side of the ice sheet.

23. The method of claim 22 and further comprising:
attaching a second ice-hole flaring bracket holding a second ice-hole flaring blade to the central shaft of the ice auger generally opposite the first ice-hole flaring blade, the second ice-hole flaring blade having a free end and a pivot end pivotally attached to the second ice-hole flaring bracket, the second ice-hole flaring blade being movable between a transport position wherein the second ice-hole flaring blade projects upwardly generally parallel to the central shaft, and an operating position wherein the second ice-hole flaring blade extends outward from the shaft at a desired obtuse angle.

24. The method of claim 22 and further comprising:
pivoting the blade back into the transport position; and
removing the ice auger and the attached first ice-hole flaring blade from the ice hole.

25. The method of claim 24 wherein the pivoting step further comprises:
engaging the hole in the ice with the free end of the blade so that contact with the bottom of the sheet of ice pivots the blade back into the transport position.

26. The method of claim 22 and further comprising:
locking the first blade in the transport position.

27. The method of claim 22 wherein the first blade has a plurality of ice-fracturing teeth.

28. The method of claim 22 wherein the ice auger has an ice-hole flaring stabilizer mounted relative to the shaft.

29. The method of claim 28 wherein the hole defines a first diameter, and wherein the ice-hole flaring stabilizer is a ring extending coaxially about the central shaft and being of generally the first diameter.

30. The method of claim 28 wherein the ice hole stabilizer includes one or more radial spacer shoes mounted on an outer rim edge of the spiral auger blade and spaced generally equally circumferentially about the central shaft relative to the ice-hole flaring blade.

\* \* \* \* \*